UNITED STATES PATENT OFFICE.

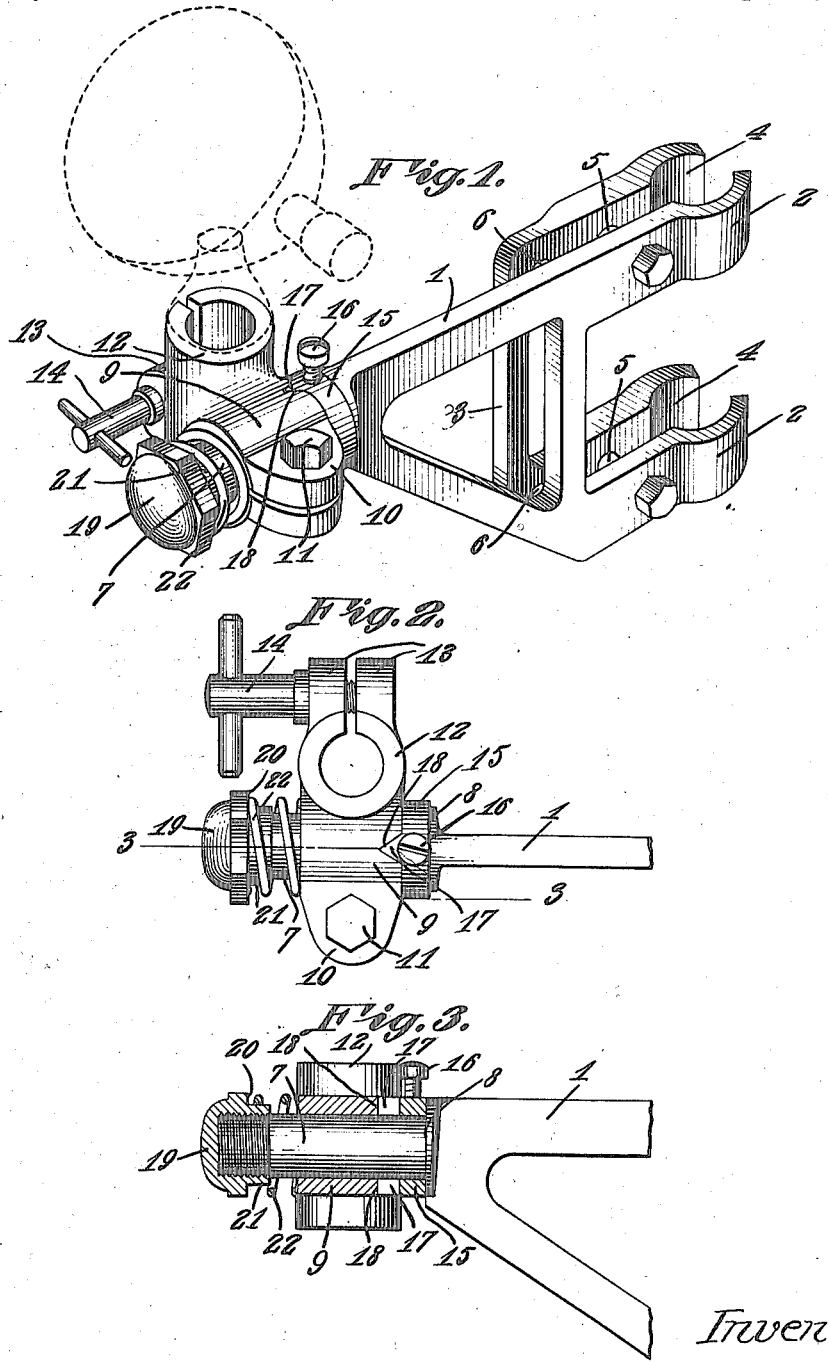

WALLER LOUIS KAUFMANN, OF SANTA ANA, CALIFORNIA.

AUTOMATIC SPOT-LIGHT BRACKET.

1,263,560. Specification of Letters Patent. Patented Apr. 23, 1918.

Application filed August 28, 1917. Serial No. 188,624.

*To all whom it may concern:*

Be it known that I, WALLER L. KAUFMANN, a citizen of the United States, residing at Santa Ana, in the county of Orange and State of California, have invented a new and useful Automatic Spot-Light Bracket, of which the following is a specification.

The present invention appertains to lamp brackets, and aims to provide a novel and improved bracket adapted especially for supporting an automobile spot light or similar lamp in one position, yet permitting it to be moved to other positions.

By way of explanation, it may be said that there is considerable agitation in a number of the States in regard to the use of spot lights on automobiles, because the drivers of the cars keep the lights entirely too high, and said light being extremely powerful, renders it difficult if not impossible for approaching drivers or pedestrians to see their way, which not infrequently causes accidents and collisions. The present contrivance is designed for holding the spot light in one position so that the light is thrown on the ground or road at the distance ahead of the automobile which the law requires, but should the driver desire to raise the light for reading a road sign, or the like, this can be done, but when the lamp is released it will automatically fall back into place to lower the light as before.

The invention has for its object the provision of a lamp bracket provided with novel adjustable means for supporting a lamp, and permitting it to be tilted or turned, the construction being simple and inexpensive, as well as being thoroughly practical and efficient in use.

With the foregoing and other objects in view, which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

The invention is illustrated in the accompanying drawing, wherein:

Figure 1 is a perspective view of the improved bracket.

Fig. 2 is a fragmental plan view of the bracket showing the lamp supporting means.

Fig. 3 is a section on the line 3—3 of Fig. 2.

The bracket proper is designated by the numeral 1 and is provided at one end with jaws 2 to fit the post of a windshield or other supporting member of an automobile. A clamping member 3 at one side of the bracket has jaws 4 complementing the jaws 2 to engage the support, and said member is connected by bolts 5 with the bracket 1 to clamp the support between the jaws, thereby holding the bracket in outstanding position, preferably at one side of the car. The member 3 has fulcrum lugs 6 to bear against the bracket 1, whereby the bolts 5 in being tightened will swing the member 3 on the lugs 6 as fulcrums to move the jaws 4 toward the jaws 2.

The free end of the bracket is provided with an outstanding horizontal pintle 7 and a shoulder 8 at the basal end of said pintle, and the lamp-holding means embodies a split clamp or sleeve 9 embracing the pintle 7 and provided at its split portion with outstanding ears 10 to which a clamping bolt 11 is engaged for holding the sleeve contracted. This sleeve is sufficiently loose, however, to permit it to turn on the pintle, but when desired, the sleeve can be made to tightly embrace the pintle to prevent the sleeve from turning. The sleeve 9 is provided at that side opposite to the ears 10 with a split clamp or socket 12 at right angles therewith for the reception of the shank or stem of a spot light or lamp, which is preferably located above the bracket, as suggested in dotted lines in Fig. 1. The split portion of the socket 12 is opposite to the sleeve 9 and is provided with outstanding ears 13 connected by a bolt 14 whereby the socket can be contracted to tightly hold the shank or stem of the lamp, the bolt 14 when loosened permitting the lamp to be adjusted in different angular positions about its shank or stem as an axis.

As a means for holding the lamp in one position to direct the light onto the road or ground at the desired distance ahead, yet permitting the lamp to be tilted for raising the light, a collar 15 is fitted on the pintle 7 and rests against the shoulder 8, being located between said shoulder and the sleeve 9. This collar is held in any adjusted position on the pintle by means of a set screw 16 carried by the collar to contact with the pintle, although other means for holding the collar can be used. The collar 15 is provided, preferably at diametrically opposite points, with V-shaped lugs 17, and the sleeve 9 is provided with similarly shaped notches 18 to receive said lugs. Thus, when the notches 18 engage the lugs 17, and the lamp is tilted to direct the light to the desired point on the road, the set screw 16 is tightened, thereby holding the collar 15 in its desired adjusted position. Therefore, when the notches 18 are held in engagement with the lugs 17, this will hold the lamp in proper position, according to the requirements.

The sleeve is held against the collar 15 yieldably, and for this purpose a cap or nut 19 is threaded onto the edge of the pintle 7 and is provided with a shoulder 20 and a reduced portion 21 extending beyond said shoulder, and a coiled wire expansion spring 22 surrounds the reduced portion 21 and is confined between the cap and sleeve 9, the spring bearing against the shoulder 20. This spring, therefore, moves the sleeve 9 inwardly to hold it against the collar, therefore, preventing the sleeve from turning accidentally. Should the operator desire to raise the light for reading a road sign, or the like, this can be readily done by turning the light outwardly so as to force the sleeve 9 away from the collar 15. The sleeve 9 can, therefore, turn with the lamps, to raise the light, the notches 18 being moved away from the lugs 17, by a cam action therebetween, the spring 22 tending to return the lamp by the pressure of the sleeve against the cam lugs 17. The light can, therefore, be raised the desired amount, but as soon as the lamp is released it will drop downwardly into place, and the sleeve 9 will move into full engagement with the lugs 17 when the lamp is returned to normal position, thus rendering the device automatic. The reduced portion or extension 21 of the cap serves as a stop to limit the outward movement of the sleeve 9 away from the lugs 17, the spring 22 when compressed moving onto said reduced portion, thus providing a desirable arrangement.

Having thus described the invention, what is claimed as new is:

A bracket having a pintle and a shoulder at the basal end of the pintle, a collar fitted on the pintle against said shoulder, means for securing the collar on the pintle in various angular positions, a lamp holder mounted for turning movement on the pintle, said holder and collar having an interengageable lug and notch to retain the holder in one position, a cap on the free end of the pintle, and an expansion spring between said cap and holder.

In testimony that I claim the foregoing as my own, I have hereto affixed my signature in the presence of two witnesses.

WALLER LOUIS KAUFMANN.

Witnesses:
 D. N. KELLY,
 SOPHIE POHNDORF.